United States Patent
Shoemaker

(12) 
(10) Patent No.: US 6,325,387 B2
(45) Date of Patent: *Dec. 4, 2001

(54) PACKING GLAND ASSEMBLY

(75) Inventor: Dennis M. Shoemaker, Montoursville, PA (US)

(73) Assignee: The Young Industries, Inc., Muncy, PA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/097,848

(22) Filed: Jun. 16, 1998

(51) Int. Cl.$^7$ ........................................... F16J 15/26
(52) U.S. Cl. ............................................ 277/511; 277/519
(58) Field of Search .................................. 277/510, 511, 277/519, 329

(56) References Cited

U.S. PATENT DOCUMENTS

| | | | | |
|---|---|---|---|---|
| 808,082 | * | 12/1905 | Fuller ................................ | 277/519 X |
| 4,289,317 | * | 9/1981 | Kuc .................................... | 277/511 X |
| 4,480,842 | * | 11/1984 | Mahyera et al. ..................... | 277/329 |
| 4,623,152 | * | 11/1986 | St. Jean ............................... | 277/519 |
| 4,878,677 | * | 11/1989 | Larkins et al. ....................... | 277/511 |
| 5,476,271 | * | 12/1995 | Hatting et al. ....................... | 277/511 |

\* cited by examiner

Primary Examiner—Robert J. Sandy
Assistant Examiner—Karlena D. Schwing
(74) Attorney, Agent, or Firm—Lalos & Keegan

(57) ABSTRACT

A packing gland assembly mountable on a shaft extending through an opening in a wall member of an apparatus consisting of a main housing member mountable on the shaft having an opening for receiving the shaft therethrough, the opening being provided with an enlarged section defining an annular space about the shaft when the man housing member is mounted on the shaft with the shaft extending through the opening therein; a split housing member mountable on the shaft including a section receivable in the annular space provided by the main housing section, such section having an opening for receiving the shaft therethrough and being provided with an enlarged section defining an annular space about the shaft when the main and split housing members are mounted on the shaft with the shaft extending through the openings therein; at least one packing ring mountable on the shaft and receivable within the annular space of the split housing member when the main and split housing members are mounted on the shaft in the assembled condition; a follower member mountable on the shaft, including a section received in the second mentioned annular space, in engagement with the packing ring when the main and split housing members, the packing ring and the follower member are mounted on the shaft in the assembled condition; and means for urging the follower member toward the main housing member for compressing the packing ring, causing it to expand radially and thus form a seal between the shaft and the assembly.

16 Claims, 2 Drawing Sheets

PACKING GLAND ASSEMBLY

This invention relates to a packing gland assembly mountable on a rotatable and/or an axially displaceable shaft, and more particularly to such an assembly which may be readily dismounted from a shaft for removing and replacing the packing rings thereof and/or cleaning the components thereof.

BACKGROUND OF THE INVENTION

Conventional packing gland assemblies mountable on rotatable and/or axially displaceable shafts of various devices such as horizontal batch mixers, motors, rotary valves, pumps and the like, generally consist of a housing member mountable on a shaft, having an opening for receiving the shaft therethrough, provided with an enlarged, annular section about the shaft when the housing is mounted on the shaft, a set of packing rings mountable on the shaft within the annular space of the housing member, a follower member mountable on the shaft and engaging the packing rings and means for pressing the packing rings against an annular wall of the housing member to expand the rings radially and thus form a seal between the shaft and the housing. Typically, such packing rings must be replaced and/or the assembly must be cleaned periodically which requires the dismounting of the assembly and the disassembly of the components thereof. Such disassembly of the components often is hampered by the fact that the packing rings become lodged within the housing and are difficult to remove. Various tools often are required to remove such lodged rings including various hooks, screws and other forms of extractors. It thus has been found to be desirable to provide a packing gland assembly which may be readily dismounted from a shaft and disassembled to replace the packing rings and/or clean the components thereof which does not require any special tools for extracting and removing the packing rings from such an assembly.

SUMMARY OF THE INVENTION

The present invention provides a novel packing gland assembly mountable on a rotatable and/or an axially displaceable shaft extending through an opening in a wall member of a device such as a horizontal batch mixer, motor, pump, rotary valve and the like, generally comprising a first housing member mountable on the shaft, having an opening therein for receiving the shaft therethrough, provided with an enlarged section defining an annular space about the shaft when the first housing member is mounted on the shaft with the shaft ending through opening therein, a second housing member mountable on the shaft, including a section receivable in the annular space provided by the first housing member, such section having an opening for receiving the shaft therethrough, provided with an enlarged section defining a second annular space about the shaft when the first and second housings are mounted on the shaft with the shaft extending through the openings thereof, such second housing member being divided into at least two components cooperable to encompass the shaft about the circumference thereof, at least one packing ring mountable on the shaft and receivable within the second mentioned annular space when the first and second housing members are mounted on the shaft with the shaft extending through the openings therein, a follower member mountable on the shaft, including a section received in the second mentioned annular space, in engagement with the packing rings when the first and second housing members, the packing rings and the follower member are mounted on the shaft with the shaft extending through the openings therein and means for pressing the follower member toward the fist housing member to compress the packing rings, causing the rings to expand radially and thus form a seal between the shaft and the assembly. With such an assembly, whenever it is desired to dismount and disassemble the assembly to replace the packing rings and/or clean the components thereof, all that needs to be done is simply to remove the pressing means, back off the follower member, back off the second housing member which will cause the packing rings to be removed from within the first housing member and then part the components of the second housing member to provide access to the exposed packing rings and thus facilitate their removal.

DESCRIPTION OF THE PREFERRED EMBODIMENT OF THE INVENTION

Figure 1:
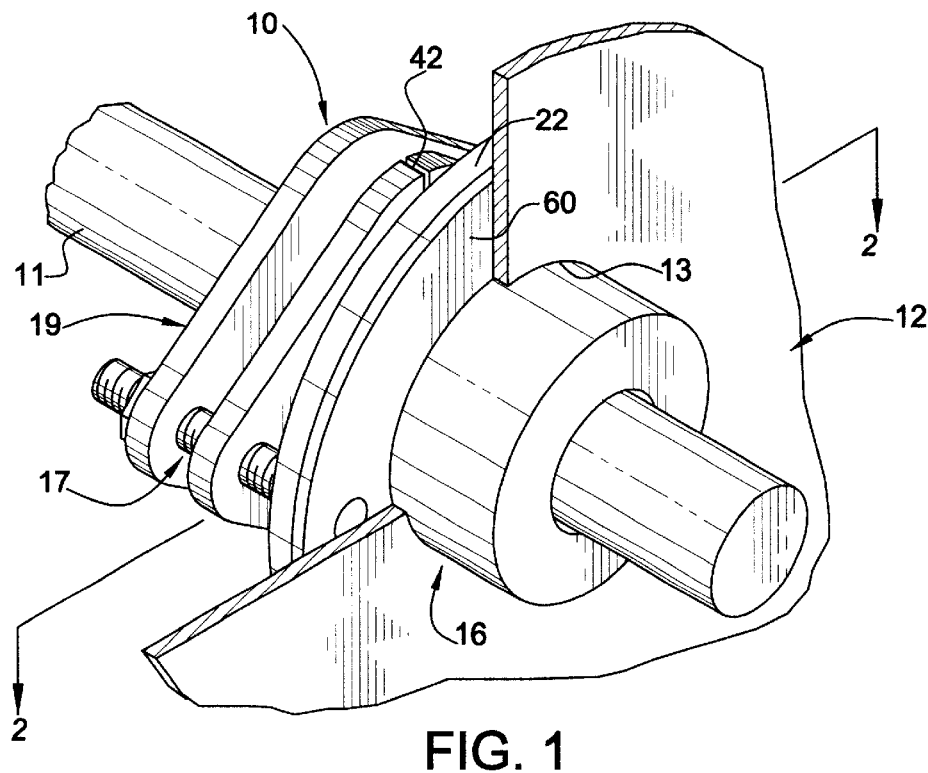
FIG. 1 is a perspective view of an embodiment of the invention, illustrating the embodiment in the assembled condition, mounted on a shaft and secured to a wall member of a device to which the shaft is connected, having portions of such wall member taken away.
Figure 2:
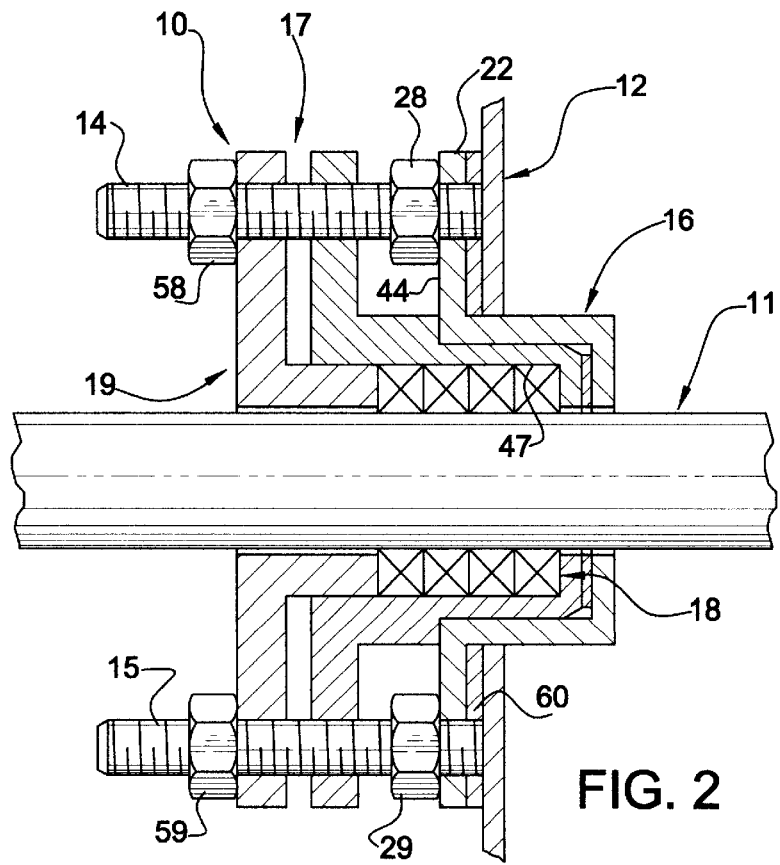
FIG. 2 is a cross-sectional view taken along line 2—2 in FIG. 1.

Referring to FIG. 1 of the drawings, there is illustrated an embodiment of the invention consisting of a packing gland assembly 10 mounted on a rotatable shaft 11 and secured to an end wall 12 of a horizontal batch mixer. Shaft 11 extends through a circular opening 13 in end wall 12 and typically has a one or more blades mounted on the inner end thereof. The outer end thereof typically is coupled to the output shaft of a motor. As best seen in FIG. 2, a pair of threaded studs 14 and 15 are rigidly secured at one set of ends thereof preferably, by welding, to an outer side of end wall 12. The studs are displaced radially relative to the centerline of opening 13, 180° apart and are disposed parallel to the center line of opening 13.

Assembly 10 includes a main housing member 16, a split housing member 17, and a set of packing rings 18 and a follower member 19. Main housing member 16 includes a cylindrical section 20 provided with an opening 21 for receiving a portion of shaft 11 therethrough, and a flange section 22 disposed in a plane lying normal to the axis of opening 21. Opening 21 has an enlarged portion providing a cylindrical surface 23 and an annular end surface 24 which cooperate with shaft 11 when the main housing member is mounted on shaft 11 to define an annular space 25. As best shown in FIGS. 1 and 2, cylindrical section 20 has a diameter slightly less than the diameter of opening 13 in the end wall so that section 20 is received through such opening when mounted on shaft 11 in the assembled condition. Flange section 22 also is provided with a pair of spaced openings 26 and 27 which are adapted to receive threaded studs 14 and 15 therethrough when the housing member is mounted on shaft 11 and housing section 20 is received through wall opening 13. The main housing member is secured in the assembled condition to valve wall 12 by means of a pair of nuts 28 and 29 threaded on studs 14 and 15 and run up against flange section 22.

Figure 3:
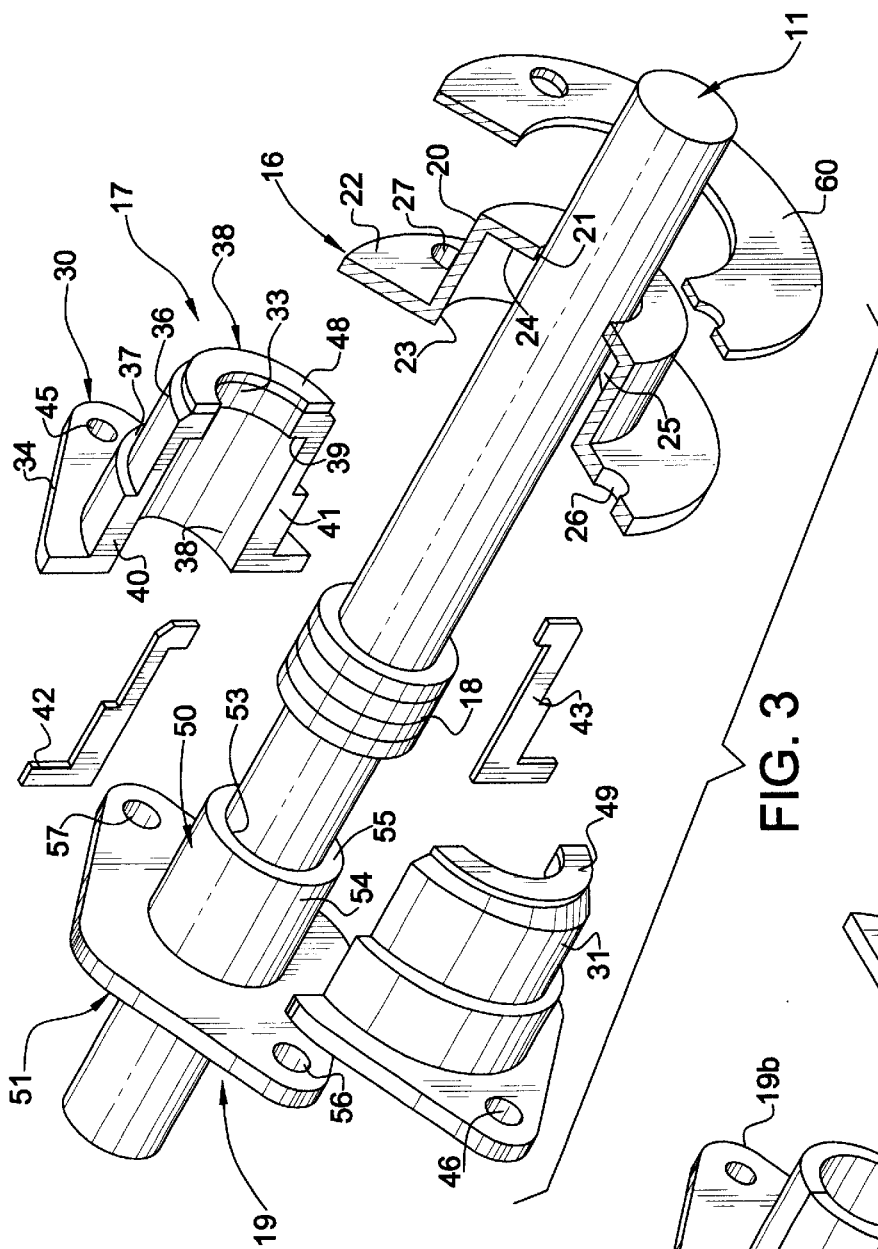
FIG. 3 is a perspective view of the embodiment shown in FIGS. 1 and 2, illustrating the components in exploded relation.

Split housing member 17 consists of identically configured components 30 and 31 which are adapted to be mated together, mounted on shaft 11 and supported on end wall 12 with a portion thereof received within annular space 25 when main housing member 16 and split housing member 17 are mounted on shaft 11 in the assembled condition. As best shown in FIG. 3, split housing component 30 consists of a semi-cylindrical section 32 providing a semi-cylindrical opening 33 therethrough for receiving a portion of shaft 11 therethrough, and a flange section 34. Section 32 is provided with a semi-annular front face surface 35 and an outer, semi-cylindrical recess providing a semi-cylindrical bearing surface 36 and a semi-annular stop shoulder 37. Semi-cylindrical opening 33 has an enlarged section providing a semi-cylindrical inner surface 38 and a semi-annular surface 39. Split housing component 17 further is provided with a pair of mating surfaces 40 and 41 lying in a plane passing through the axis of opening 33 which are adapted to mate with comparable surfaces on split housing component 31 to embrace a portion of shaft 11 with a pair of elastomer seals 42 and 43 disposed therebetween.

In the assembled condition, split housing components 30 and 31 are adapted to be mated together encompassing shaft 11 with a portion of the semi-cylindrical sections thereof being received within annular space 25 of main housing member 16, the front face surfaces thereof engaging annular surface 24 of the main housing member and the semi-annular, outer shoulder surfaces 37 engaging flange surface 44 of flange 22 of the main housing section, as best shown in FIG. 2. In such condition, threaded studs 14 and 15 will be received through openings 45 and 46 provided in the flange sections of the split housing components, and the enlarged portions of the openings in the semi-cylindrical sections thereof will cooperate with shaft 11 to provide an annular space 47 for receiving therein packing rings 18 mounted on shaft 11. As best shown in FIG. 3, the front face surfaces of the split housing components are provided with sponge neoprene seals 48 and 49 forming a seal between the two housing members.

Follower member 19 includes a cylindrical section 50 and a flange section 51. Cylindrical section 50 is provided with an opening 53 therein for receiving shaft 11 therethrough, and is adapted to be received within annular space 47 defined by the shaft and the split housing components in assembled condition, to bear against packing rings 18 mounted on the shaft and disposed within such annular opening. Section 50 has a cylindrical surface 54 provided with a diameter slightly less than the diameter of inner cylindrical surface 38, and an annular surface 55 adapted to engage the packing rings disposed on the shaft within annular space 47. Flange section 51 also is provided with a pair of openings 56 and 57 which are adapted to receive threaded studs 14 and 15 therethrough when the follower member is in the assembled condition with section 50 thereof received within annular space 47, bearing against the packing sing. The follower member is urged against the packing rings to cause them to deform and expand radially relative to the axis of the shaft to provide a seal between the shaft and the assembly, by means of a pair of nuts 58 and 59 threaded on studs 14 and 15 and run up against the rear face of flange section 51 of the follower member.

With the drive motor disconnected from shaft 11, the assembly as described may be installed by first applying an annular gasket 60 onto the shaft up against the outer side of the end wall with stud members 14 and 15 projecting through the stud openings therein, and then sliding the main housing member onto the shaft and into its assembled condition with cylindrical section 20 received within wall opening 13 and flange section 22 positioned up against the outer side of gasket 60 with studs 14 and 15 being received through openings 26 and 27 of the flange portion thereof The main housing member may then be firmly secured to the wall member by threading nuts 28 and 29 on the stud members and running them up tightly against the flange section. The components of the split housing member with seals 42,43,48 and 49 bonded thereon may then be mounted in mating relation on the shaft and slid forwardly so that the forward portions of the semiclindrical sections thereof are received within annular space 25, seals 48 and 49 thereof engage annular surface 24 of the main housing member to provide a seal between the split housing member and the main housing member, the semi-annular shoulders of the split housing components engage the rear face of the flange section of the main housing member and threaded studs 14 and 15 are received through openings 45 and 46 of the flange sections of the split housing components. Packing rings 18 then are mounted on the free end of the shaft and slid up into annular space 47 and against the annular shoulder provided by semi-annular surface 39 and the comparable surface on component 31. With the packing rings thus mounted on shaft 11 and inserted within annular space 47, the follower member may be mounted onto the free end of the shaft and slid up into position with cylindrical section 50 partially received within annular space 47, annular surface 55 engaging the packing rings and the stud members being received through openings 56 and 57 of the flange section thereof. The assembly may then be completed by applying nuts 58 and 59 on the threaded studs and tightening them against the flange section of the follower member, causing the packing rings to be compressed between the follower member and the split housing section, deform and expand radially to form a seal between the shaft and the split housing member.

Whenever it is desired to disassemble the assembly for the purpose of inspecting the components, replacing the packing rings, cleaning the components or conducting a routine inspection, all that is required is to remove nuts 58 and 59, grasp the flange portion of the follower member and back it off; grasp the flange portions of the split housing components and back them off causing the packing rings to slide rearwardly from within opening 13 of the end wall, and then part the split housing components to provide ready access to the packing rings. Such manner of disassembly readily permits easy access to the packing rings which may be easily removed from the shaft and replaced with new packing rings, and readily provides access to the various components of the assembly which may be cleaned, repaired or replaced. With a new set of packing rings provided and/or the components having been inspected, cleaned, repaired or replaced, the components may be reassembled in the manner as previously described.

The size and number of studs required for securing the main housing, split housing and follower to the end wall of the apparatus on which the assembly is mounted would depend on the size of the shaft. For comparatively small shafts as shown in the drawings, a pair of studs would be sufficient to maintain the components. For comparatively larger size shafts, additional studs may be required, necessitating enlarged flange sections of the main housing, split housing and follower members, provided with additional stud receiving openings. The openings of each such additional sets of openings would be spaced 180° apart, and the sets would be equally spaced circumferentially apart to provide a uniform application of force on the packing rings.

Although housing 17 has been described as being split into two parts, it is to be understood that such member can be split into a greater number of parts. For large shafts, a greater number of parts may be more accommodating. In addition to housing 17, main housing 16 and possibly follower member 19 may be split into two or more parts to further facilitate their mounting and dismounting of such components in assembling and disassembling the entire assembly.

Figure 5:
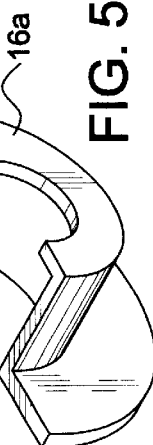
FIG. 5 is a perspective view of a section which may be mated with a similar section to form an alternative to the primary housing shown in FIG. 3.
Figure 4:
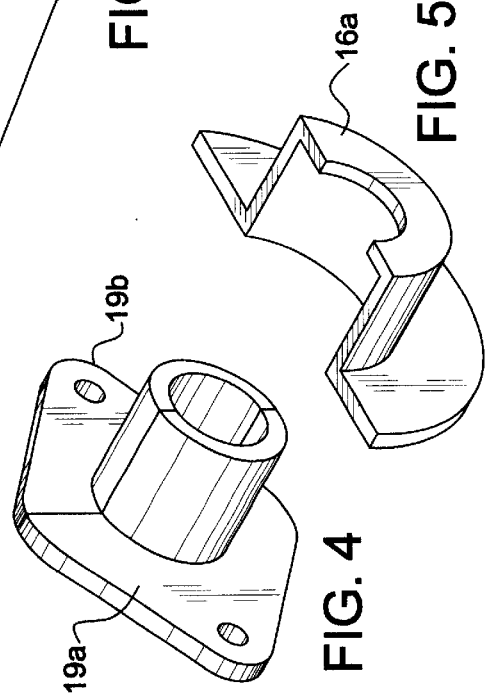
FIG. 4 is a perspective view of an alternative to the follower member shown in FIG. 3 which may be used in the present invention, consisting of a pair of split members shown mated together in their operative condition.

FIG. 4 illustrates a pair of follower sections 19a and 19b which consist of a pair of identical sections formed by splitting a follower 19 along a longitudinal center line. FIG. 5 illustrates a single primary housing section 16a which may be mated with a similar section to form a split primary housing member as an alternative to housing member 16. Section 16a is comparable to the sections formed by splitting housing member 16 along a longitudinal center line.

The components of the assembly may be fabricated from any suitable material and by any suitable method. Preferably, however, the components consist of carbon or stainless steel castings which have been machined. The packing rings and other seals may be formed of any commercially available elastomeric or other stable materials. It further is contemplated that the assembly as described may be used in any application including a rotatable and/or an axially displaceable shaft extending into a housing where a seal is sought to be provided between the shaft and the housing such as in a horizontal batch mixer, rotary valve, pump and the like.

From the foregoing detailed description, it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited solely by the appended claims.

I claim:

1. A packing gland assembly mountable on a shaft extending through an opening in a wall member of an apparatus comprising:
    a first housing member mountable on said shaft, having an opening herein for receiving said shaft therethrough, said opening being provided with an enlarged section defining an annual space about said shaft when said first housing member is mounted on said shaft with said shaft extending through said opening therein;
    a second housing member mountable on said shaft, including a section receivable in said annular space, said section having an opening therein for receiving said shaft therethrough, said opening being provided with an enlarged section defining an annular space about said shaft when said first and second housing members are mounted on said shaft with said shaft extending through said openings therein, said second housing member being divided into at least two components unattached relative to each other and cooperable to encompass said shaft about a circumference thereof;
    at least one packing ring mountable on said shaft and receivable in said second mentioned annular space when said first and second housing members are mounted on said shaft with said shaft extending through said openings therein;
    a follower member mountable on said shaft, including a section received in said second mentioned annular space, in engagement with said packing ring, when said first and second housing members, said packing ring and said follower member are mounted on said shaft with said shaft extending through openings therein, and
    means for urging said follower member toward said first housing member for compressing said packing ring, causing it to expand radially and thus form a seal between said shaft and said assembly.

2. An assembly according to claim 1 wherein said first housing member includes a section projectable through said wall opening when said assembly is mounted on said shaft in an assembled condition.

3. An assembly according to claim 1 including a sealing means disposed between said section of said second housing member and said first housing member when said housing members are mounted on said shaft in an assembled condition.

4. An assembly according to claim 3 wherein said sealing means comprises semi-annular elastomeric seals bonded to forwardly facing surfaces of said second housing member components.

5. An assembly according to claim 1 wherein said first housing member includes a laterally projecting section detachably securable to said wall member when said assembly is mounted on said shaft in an assembled condition.

6. An assembly according to claim 1 wherein said enlarged section of said opening of said second housing member provides an end wall engaged by said packing ring when said assembly is mounted on said shaft in an assembled condition.

7. An assembly according to claim 1 wherein said enlarged section of said opening of said second housing member provides a cylindrical side wall surface and an annular end wall surface engaged by said packing ring when said assembly is mounted on said shaft in an assembled condition.

8. An assembly according to claim 1 including sealing means disposed between sets of mating surfaces of said components of said second housing member when said assembly is mounted on said shaft in an assembled condition.

9. An assembly according to claim 8 wherein each of said sealing means comprises an elastomeric material bonded to one set of said surfaces.

10. An assembly according to claim 1 wherein each of said components of said second housing member includes a laterally projecting portion which may be gripped to displace said section of said second housing member component received within said first mentioned annular space when said assembly is in an assembled condition; to correspondingly axially displace said packing ring, and further displace said section away from said shaft to provide easy access to said packing ring.

11. An assembly according to claim 1 including a set of packing rings disposed on said shaft within said second mentioned annular space when said assembly is mounted on said shaft in an assembled condition.

12. An assembly according to claim 1 wherein said section of said follower member is cylindrical.

13. An assembly according to claim 1 wherein each of said members includes laterally projecting sections, said laterally projecting sections include at least one set of registrable openings, and said urging means includes a threaded stud rigidly secured to said wall member and extending through said registered openings, a first nut threaded on said stud and run up against the projecting section of said first housing member and a second nut threaded on said stud and run up against the projecting section of said follower member when said housing and follower members are mounted on said shaft in an assembled condition.

14. An assembly according to claim 1 wherein said section of said second housing member includes an annular recess on an outer surface thereof providing an annular shoulder which abuts said first housing member when said section of said second housing member is received within said annular space of said first housing member.

15. An assembly according to claim 1 wherein said first housing member is split along at least one longitudinal plane into at least two components cooperable to encompass said shaft about a circumference thereof.

16. An assembly according to claim 1 wherein said follower member is split along at least one longitudinal plane into at least two components cooperable to encompass said shaft about a circumference thereof.

* * * * *